United States Patent
Crocco et al.

(10) Patent No.: US 10,094,911 B2
(45) Date of Patent: Oct. 9, 2018

(54) METHOD FOR TRACKING A TARGET ACOUSTIC SOURCE

(71) Applicant: FONDAZIONE ISTITUTO ITALIANO DI TECNOLOGIA, Genoa (IT)

(72) Inventors: Marco Crocco, Ovada (IT); Vittorio Murino, Rapallo (IT); Andrea Trucco, Genoa (IT); Samuele Martelli, Genoa (IT)

(*) Notice: Subject to any disclaimer, the term of this patent is extended or adjusted under 35 U.S.C. 154(b) by 0 days.

(21) Appl. No.: 15/531,444

(22) PCT Filed: Nov. 18, 2015

(86) PCT No.: PCT/IB2015/058922
§ 371 (c)(1),
(2) Date: May 29, 2017

(87) PCT Pub. No.: WO2016/087973
PCT Pub. Date: Jun. 9, 2016

(65) Prior Publication Data
US 2017/0261593 A1 Sep. 14, 2017

(30) Foreign Application Priority Data
Dec. 2, 2014 (IT) .............................. GE2014A0118

(51) Int. Cl.
*G01S 5/18* (2006.01)
*G01S 3/801* (2006.01)
(Continued)

(52) U.S. Cl.
CPC ............... *G01S 5/18* (2013.01); *G01S 3/801* (2013.01); *G06K 9/0055* (2013.01);
(Continued)

(58) Field of Classification Search
CPC ....... G06T 11/206; G06T 11/60; G06T 15/08; G06T 9/005; G06T 2207/10132;
(Continued)

(56) References Cited

U.S. PATENT DOCUMENTS 6,450,960 B1* 9/2002 Rather ...................... A61B 8/15
128/916
7,318,005 B1* 1/2008 Smaragdis ........... G06K 9/6226
702/179
(Continued)

FOREIGN PATENT DOCUMENTS

WO 2014115088 7/2014

OTHER PUBLICATIONS

Lu Wenbo et al: A gearbox fault diagnosis scheme based on near-field acoustic holography and spatial distribution features of sound field, Journal of Sound and Vibration, London, GB, vol. 332, No. 10, Feb. 4, 2013, pp. 2593-2610 Abstract; figures; sections 3, 5, and 5.2.
(Continued)

*Primary Examiner* — Jeffrey Chow
(74) *Attorney, Agent, or Firm* — Themis Law

(57) ABSTRACT

A method of processing an acoustic image includes the steps of acquiring acoustic signals generated by acoustic sources in a predetermined region of space, generating a multispectral 3D acoustic image that includes a collection of 2D acoustic images, performing a frequency integration of the multispectral acoustic image for generating a 2D acoustic map, locating at least one target acoustic source of interest and modeling the signal spectrum associated with the target acoustic source, generating a classification map obtained by comparing the signal spectrum of each signal associated with each pixel of the multispectral acoustic image and the model of the signal spectrum associated with the target
(Continued)

acoustic source to distinguish the spectrum of the signal associated with the target acoustic source from the signal spectra associated with the remaining acoustic sources, and merging the classification map and the acoustic map to obtain a merged map.

10 Claims, 4 Drawing Sheets

(51) Int. Cl.
    *G06T 15/08*     (2011.01)
    *G06T 11/20*     (2006.01)
    *G06K 9/00*     (2006.01)
    *G06K 9/62*     (2006.01)
    *G06T 11/60*     (2006.01)

(52) U.S. Cl.
    CPC .......... *G06K 9/6257* (2013.01); *G06T 11/206* (2013.01); *G06T 11/60* (2013.01); *G06T 15/08* (2013.01)

(58) Field of Classification Search
    CPC ............ G06T 2207/20221; G06K 9/38; G06K 9/0055; G06K 9/6257; G01S 15/8977; G01S 13/89; G01S 15/89; G01S 15/04; G01S 15/88; G01S 15/8993; G01S 3/8083; G01S 7/20; G01S 15/8981; G01S 3/80; G06F 3/0425

See application file for complete search history.

(56) References Cited

U.S. PATENT DOCUMENTS

| | | | | |
|---|---|---|---|---|
| 9,962,142 B2 * | 5/2018 | Falahatpisheh | ........ | A61B 8/483 |
| 2012/0287749 A1 * | 11/2012 | Kutlik | .................... | G01H 3/125 |
| | | | | 367/7 |
| 2013/0208898 A1 * | 8/2013 | Vincent | .................. | H04S 7/303 |
| | | | | 381/17 |
| 2015/0192674 A1 * | 7/2015 | Banerjee | .................. | C12Q 1/04 |
| | | | | 435/34 |
| 2015/0319540 A1 * | 11/2015 | Rubinstein | ........... | H04R 23/008 |
| | | | | 381/172 |
| 2017/0086678 A1 * | 3/2017 | Oishi | .................... | A61B 5/0095 |
| 2017/0142515 A1 * | 5/2017 | Makris | ..................... | H04R 1/44 |

OTHER PUBLICATIONS

Bai Long et al: Observer-based beamforming algorithm for acoustic array signal processing, The Journal of the Acoustical Society of America, American Institute of Physics for the Acoustical Society of America, New York, NY, vol. 130, No. 6, Dec. 1, 2011, pp. 3803-3811 Abstract; figures; 1. Introduction.

* cited by examiner

METHOD FOR TRACKING A TARGET ACOUSTIC SOURCE

FIELD OF THE INVENTION

The present invention relates to a method for processing an acoustic image.

The method of the present invention firstly provides the following steps:
a) acquiring acoustic signals generated by acoustic sources in a predetermined region of space,
b) generating a multispectral 3D acoustic image,
c) performing frequency integration of the multispectral acoustic image for generating a 2D acoustic map.

BACKGROUND OF THE INVENTION

Acoustic maps have become a fundamental tool for estimating sound levels on wide areas and for predicting changes in acoustic environment related to changes of use. Acoustic prediction is widely used in the process for planning new industrial areas, wind power stations or for changes in existing structures such as, for example, the introduction of a fan for air-conditioning or road widening. A correct acoustic mapping of the environments helps both to estimate and to check changes in acoustic effect.

Acoustic mapping uses similar modelling techniques for estimating the current acoustic levels on a wide area that could not be determined by an acoustic monitoring system since it is too expensive.

Therefore, the processing of such acoustic maps is a very important aspect, in order to improve and speed up their use.

Therefore, it is considerably important to obtain acoustic map processing that aims at accurately isolating one or more target acoustic sources.

By methods known in prior art it is not possible to obtain a "clean" acoustic map that allows an immediate match and a precise location of the acoustic source of interest to be obtained.

Moreover, one of the most common uses of acoustic mapping is the tracking of a target acoustic source.

As it will be described below, the above mentioned method steps are described by documents about methods for tracking acoustic sources known in the prior art, wherein tracking algorithms use information from acoustic maps and multispectral acoustic images for locating a target acoustic track.

It is specified that, as known in prior art, the multispectral acoustic image consists of a collection of 2D acoustic images, which in turn are formed by the transposition of the position of each individual acquired acoustic source into a grayscale or color model.

Moreover, each 2D acoustic image is identified by a single frequency or a frequency band, such that each 2D acoustic image has the position of each of the detected audio sources marked thereon along the axes of the coordinates of the 2D image, for the spatial allocation of the acquired acoustic sources.

Therefore, it is clear how the multispectral acoustic image is composed of a collection of 2D images each one estimated at a single frequency or frequency bands.

As it will be clear from the description of some embodiments for each frequency, an acoustic map is identified on a 2D plane of the space region where the acquisition has been performed and the values of the pixels of each 2D image denote the space allocation of the acquired acoustic sources.

Moreover, it is specified that the acquisition step can be carried out in any manner known in the prior art.

Preferably, a beamforming algorithm is used in combination with an array of acoustic sensors for acquiring the acoustic sources present in the environment.

A possible example of such method is described in patent application WO2014/115088 to the applicant, whose contents has to be considered as an integral part of the present description.

Moreover, the acquisition step of the method of the present invention can be carried out in any environment: acoustic mapping can be about both an environment in the presence of audio sources where the acquisition is performed through an array of microphones, and underwater environment, where acoustic sources are detected through hydrophones.

Particularly, the invention relates to the processing of acoustic maps of environments with noises and disturbed by acoustic signals different from the target acoustic signal.

According to a preferred embodiment, the method of the present invention aims at solving the problem of locating and tracking an acoustic source, given a set of acoustic signals acquired by an acoustic sensor array.

Such problem is increasingly becoming important since there are many applications that use localization and tracking of an acoustic source.

The tracking of a speaker in a teleconference, the tracking of vehicles in traffic monitoring systems, the localization of general targets and the tracking in surveillance systems and in military applications are only some examples where acoustic source tracking is employed.

In all such applications the use of acoustic systems therefore plays an important role both as a help for video systems and as a real tool replacing the latter.

In particular acoustic systems are particularly suitable for replacing video systems in cases when video information is not available or is not so much useful, such as for example under conditions of poor visibility, in the night, under conditions of adverse weather or in particularly crowded environments.

In the methods known in the prior art it is possible to define different approaches for acoustic localization and tracking that can be divided in different groups:

Time-Difference-of-Arrival (TDOA)=it is about methods where TDOAS are estimated for each pair of acoustic sensors and then used for deducing the location of the acoustic source on the basis of the geometry of the microphone array, Steered Response Power=it is about methods where the location of the acoustic source is directly estimated by scanning all the possible space locations through a beamforming algorithm and by using the local peaks of the obtained acoustic map.

These two first groups have an important drawback, since typically the acoustic signal is particularly noisy due to reverberations and to noise acoustic sources, therefore the localization of the acoustic source based on a single time interval is subject to the detection of anomalous values due to spurious peaks present in the acoustic map.

In order to face such drawback, the localization and tracking methods known in the prior art use the time consistency of the acoustic source along the several time intervals.

Another method known in the prior art is about the algorithms known as "Batch Approaches [17]" that deduce the trajectory of an acoustic source on the basis of a set of localizations measured in adjacent time intervals.

The main drawback of such algorithms is the need of detecting the whole group of time intervals before estimating the desired trajectory, a characteristic that has a particularly disadvantageous aspect in case of real-time detections.

Other algorithms known in the prior art are those about the "First Order Markov Process approaches" group, where the position of the acoustic source is tried to be found in a specific instant, on the basis of the knowledge of the following instant.

Among such algorithms the Particle Filter [8] is mentioned which is particularly efficient in presence of non-Gaussian disturbing noises provided in positions different than the position of the target acoustic source.

Regardless of the specific tracking algorithms, an alternative approach consists in using the whole acoustic map instead of the set of spread positions where the acoustic source of interest has been identified.

Thus the possible loss in information caused by the insertion of threshold values or by the use of filters is avoided.

Such approach has been followed in the documents [9], [10] and also in document [11] in combination with the concept of Track before Detect (TBD), suggested and disclosed in the document [12].

Another problem to be faced in tracking acoustic sources is the temporary inactivity of the target, such as for example pauses during speech, disclosed in document [13] and in document [11].

The acoustic tracking problem can be about not only one single target source, but also about a plurality of target sources, such as disclosed in documents [11] and [17].

All the methods and approaches described and belonging to the prior art, mainly have an important drawback that creates instability in the algorithms as well as restrictions in using the methods themselves.

In presence of a noise source with high energy and persistent over time, the known prior art tracking algorithms tend to find the noise source instead of the target source.

The acoustic map provides only information about the space allocation of the sound energy and no other information useful for distinguishing the target source from noise sources.

It is obvious how the methods known in prior art are inefficient in environments with noises, that is in most of the environments where generally acoustic localization and tracking are performed.

Also the document LU WENBO ET AL: "A gearbox fault diagnosis scheme based on nearfield acoustic holography and spatial distribution features of sound field", JOURNAL OF SOUND & VIBRATION, LONDON, GB, vol. 332, no. 10, 4 Feb. 2013 (2013-02-04), pages 2593-2610, XP028985954, ISSN: 0022-460X, DOI: 10.1 016/J.JSV.2012.12.018 describes a method according to the preamble of claim 1.

Therefore there is a need not satisfied by the methods known in prior art to provide a method for processing acoustic images and a consequent method for tracking a target acoustic source that is robust, efficient and that overcomes the drawbacks of the methods known in the prior art, particularly allowing a "clean" acoustic map and not affected by noise acoustic sources to be obtained also in environments with noises and high energy disturbance acoustic signals.

SUMMARY OF THE INVENTION

The present invention achieves the above objects by a method such as described hereinbefore and in the preamble of claim 1, wherein the following steps are performed:

d) locating at least one target acoustic source of interest and modeling the signal spectrum associated with the target acoustic source, e) generating a classification map obtained by comparing the signal spectrum of each signal associated with each pixel of the multispectral acoustic image and the model of the signal spectrum associated with the target acoustic source, f) merging the classification map and the acoustic map to obtain a merged map.

In particular, the comparison is obtained by training a classification algorithm, which is executed for each pixel of the multispectral acoustic image, to thereby distinguish the spectrum of the signal associated with the target acoustic source from the signal spectra associated with the remaining acoustic sources.

Unlike the methods known in prior art, a robust method is obtained also in presence of high energy noise acoustic sources.

This takes place since, unlike methods known in prior art, the acoustic map obtained by the performed processing is not based only on the acoustic map or on the acquisitions carried out by means of the array of acoustic sensors, but on a further processing of the multispectral acoustic image, namely on the classification map.

The presence of the classification map prevents the acoustic map obtained after the processing from being contaminated by the noise acoustic sources, not allowing the target acoustic source to be isolated.

In methods known in prior art, this takes place since the acoustic map provides only information about the space allocation of the acoustic energy but is does not provide information useful for distinguishing the target source from disturbance sources and noise, on the contrary this is carried out by the comparison of the classification map and the acoustic map of the method of the present invention.

Moreover, in comparison with methods known in prior art, it does not analyze a frequency spectrum merely derived from a signal acquired by an acoustic sensor, but it starts from signal spectra, corresponding to each pixel of the multispectral acoustic image, obtained by the beamforming algorithm applied to the acoustic signals acquired by the array of acoustic sensors.

The method of the present invention provides the identification of the acoustic source that has a specific spectral signature, wherein such acoustic source is located on the merged map, such not to be affected by other sources.

According to a preferred embodiment, step d) provides a sub-step d1) of identifying the spectral signature of the signal generated by the target acoustic source.

In combination with such sub-step d), the step e) provides the following steps:

e1) comparing the spectral signature of the signal generated by the target acoustic source with the spectral signatures of the signals associated with the individual pixels of the multispectral acoustic image, e2) generating the classification map, such that the value of each pixel of the classification map indicates the probability that each signal being compared will be transmitted by the target acoustic source.

Therefore, a systematic control of each pixel is carried out for evaluating with which probability the signal associated to the several pixels actually is the one transmitted by the target source.

Generally, the use of acoustic maps for any activities, such as localization and tracking of target acoustic sources, presupposes the knowledge a priori of the characteristics of the signal desired to be identified, therefore the signal spectrum and its characteristics are known in statistical terms.

Therefore, it is easy to use such signal spectrum in a systematic manner for comparing it with the acquired acoustic sources and for obtaining the classification map.

An example of such process will be described below and it will be clear how the classification map allows a series of classification algorithms to be applied to a series of spectra that are related to a series of directions of arrival.

Therefore, the acoustic sources of a predetermined space volume are acquired, the acoustic sources are separated as regards the space and direction point of view and a classification algorithm is applied on each signal in a systematic manner.

According to a possible embodiment, step d) provides a sub-step d2) of identifying the spectral signatures of the signals generated by acoustic noise sources.

In this case the classification algorithm is trained to distinguish the spectrum of the signal associated with the target acoustic source from the signal spectra associated with the acoustic noise sources.

According to a further preferred embodiment, step f) about the merging between the acoustic map and the classification map is obtained by multiplying the values of the pixels of the acoustic map obtained in step c) by the values of the pixels of the classification map obtained in step e).

Such characteristic has a particularly advantageous aspect since it allows a "cleaning" action for the acoustic map to be obtained, while keeping the high resolution thereof, but at the same time it allows the map to be cleared from noise acoustic sources, that have very low classification values.

As said above the classification map shows the values of the probability that the pixel subjected to the comparison is associated with the signal representing the target acoustic source: the merged map thus represents only the contribution given by the sources of interest.

Preferably, it is possible to carry out steps filtering the frequencies as regards step c) performing frequency integration of the multispectral acoustic image for generating the acoustic map.

Advantageously, the filtering steps can be composed at least of one step weighting the frequency bands or the frequencies of the multispectral acoustic image.

As said above, since the target acoustic source is known in advance, it is possible to concentrate the location thereof on preferential frequency bands, therefore it is possible to provide a lower weighting index for the frequencies not belonging to the spectrum of the signal desired to be tracked.

As said above, according to a preferred embodiment, the acoustic map obtained by the processing of the method of the present invention is used for tracking a target acoustic source.

In this case the method provides the following steps:
g) generating a probability function based on said merged map,
h) executing a tracking algorithm.

The generated probability function therefore is used by the tracking algorithm for locating and tracking the target acoustic source.

It is possible to use any tracking algorithms known in the prior art, such as for example those described in the documents mentioned above.

According to an improvement of the method of the present invention, step g) is carried out by performing the following steps:

g1) transforming the merged map into a probability function,
g2) generating an additional probability function indicating the possible dynamic path of the target acoustic source, obtained using predetermined dynamic models,
g3) comparing the function obtained in step g1) and the function generated in step g2) to express the conditional probability that said merged map has been obtained using the dynamic model of the target acoustic source.

Also in this case the method of the present invention presumes the knowledge of the characteristics of the acoustic source that has to be tracked and on the basis of such characteristics it generates the dynamic model thereof.

It is clear that the tracking of an object moving with continuous and controlled motions, such as a ship or an airplane, follows a dynamic model different from that of objects performing sudden and irregular changes of direction, such as for example a flying insect.

Therefore the further probability function generated in step g2) considers all the dynamic models.

Advantageously, the additional probability function generated in step g2) is a function that, given an assumption, namely the fact of supposing the target acoustic source to be in a specific point on the basis of the dynamic model, generates a probability distribution of how the acoustic map would likely be.

After the "fitting" value of the acoustic map obtained by the result of the probability function generated in step g2) is verified.

In order to accomplish this it is necessary for the acoustic map to have values comparable with the probability function of step g2), therefore, the pixel values are transformed in probability values.

An example of such transformation will be described below by showing some embodiments.

The result of such comparison will be used by the tracking algorithm for the localization and tracking of the target acoustic source.

As described above, preferably step a) acquiring the acoustic sources is carried out using an array of acoustic sensors and it further provides a sub-step a1) of calibrating said array of acoustic sensors.

Any calibration methods known in the prior art can be provided.

Advantageously, according to a possible variant embodiment, it is possible to provide said sub-step a1) to comprise the acquisition of an optical image acquired by a camera or videocamera device, there being further provided a step c1) of superimposing the acoustic image generated in step c) on the acquired optical image.

Advantageously the camera or videocamera can be placed at the center of the array of acoustic sensors.

Thus a pixel-pixel acoustic and optical correspondence is obtained without the need of providing a particular calibration of the system.

Thus a mode is obtained for easily processing the acquired raw data and moreover the step generating the classification map is simplified due to the visual contribution.

Finally, such arrangement makes it possible to track and locate the target source directly on the image obtained by the camera or videocamera.

According to a preferred variant embodiment steps a) to h) are carried out in a real-time mode.

Finally on the basis of the characteristics described above, it is clear how the method of the present invention can be used for tracking and locating two or more target acoustic sources.

By knowing the characteristics of the signals emitted from several target acoustic sources, the disclosed method steps can be carried out without making particular changes thereto.

BRIEF DESCRIPTION OF THE DRAWINGS

These and other characteristics and advantages of the present invention will be clearer from the following description of some embodiments shown in the annexed drawings, wherein.

DETAILED DESCRIPTION OF EMBODIMENTS OF THE INVENTION

Figure 1A:
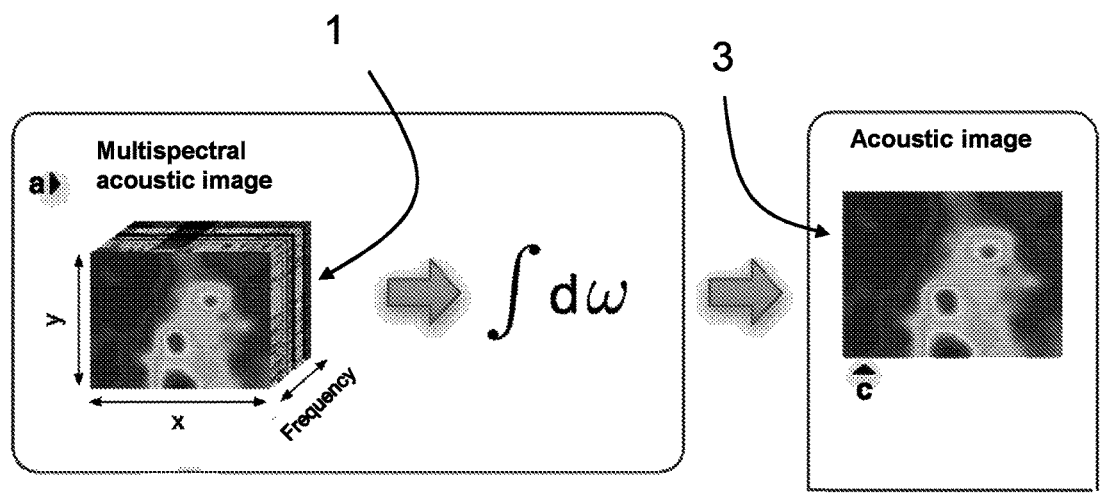
FIGS. 1a to 1d are some details of a functional block diagram of the method of the present invention according to a preferred embodiment.

It is specified that the embodiment shown in the figures is shown merely for illustrative purposes, in order to better understand the advantages and the characteristics of the method of the present invention.

In particular, the embodiment of the method shown below is about a method for tracking a target acoustic source, but as mentioned above and as it will be clear below it comprises the method steps about the processing of an acoustic image according to the present invention.

Therefore, the shown embodiment should not be intended as a limitation to the inventive concept of the present invention, that is, to provide a method processing an acoustic image allowing a "clean" acoustic image to be obtained, which is allowing an acoustic source of interest to be identified without being affected by noise sources present within the monitored space region.

Moreover, the theoretical bases that have allowed the method steps of the present invention to be developed will be disclosed.

With particular reference to FIGS. 1a to 1d and FIG. 2, the method of processing an audio image according to the present invention is used for tracking a target acoustic source.

According to the shown embodiment, the method provides the following steps:

a) acquiring acoustic signals generated by acoustic sources in a predetermined region of space, and b) generating a multispectral 3D acoustic image 1, consisting of a collection of 2D acoustic images.

Each 2D acoustic image is formed by the transposition of the position of each of the acquired acoustic sources into a grayscale or color model.

Moreover, each 2D acoustic image is identified by a single frequency ω or a frequency band, such that each 2D acoustic image has the position x, y of each of the detected acoustic sources marked thereon along the axis x and y that subtend the plane of the 2D image, for spatial allocation of the acquired acoustic sources.

Moreover, the method provides for step c) of performing a frequency integration of the multispectral acoustic image 1 for generating a 2D acoustic map 3.

According to the shown embodiment the method further provides a step h) of executing a tracking algorithm.

Particularly as regards steps a) and b) it is specified that if a tern of Cartesian coordinates in the 3D space is defined with (x, y, z) and a camera is assumed to be placed at the origin of the coordinates and oriented along axis Z, coordinates x and y of the 2D image can be defined as follows:

$$(x,y)=(f\,x/z, f\,y/z)$$

where f is the focal length.

Now we can define I° t (h, k) as the optical image with resolution H, K function of the pixels with indexes h=1 ... H, K=1 ... K showing the 3D scene within the time interval t.

Coordinates in the image plane of the (h, k)-th pixel are given by the following formula:

$$(x_h, y_k)=(h\Delta x, k\Delta y),$$

wherein $\Delta x$ and $\Delta y$ are the horizontal and vertical pitch among adjacent pixels.

Analogously with the optical image, an acoustic image projecting the set of acoustic sources in 3D space on the same image plane can be defined.

To construct the acoustic image a planar array of acoustic sensors is preferably used in combination with the known "SRP filter and sum beamforming" [18], as described in patent application WO2014/115088.

The "filter-and-sum beamforming" in combination with the geometric arrangement of the acoustic sensors allows very wide acoustic bands to be acquired, while allowing a high resolution at lower frequencies, as well as absence of artifacts at higher frequencies [19].

However, if two or more acoustic sources contemporaneously emitting a sound have a high signal energy difference, it can happen that the higher energy source obscures the acquisition of the lower energy source.

Moreover, if two acoustic sources have a different nature, namely having differently shaped signal spectra, the weaker source, very likely, can be stronger or at least comparable with some frequency sub-bands.

To this end the method of the present invention uses, after beamforming, frequency sub-band normalization.

Moreover, according to an improvement of the present invention, step c) provides for a step weighting the frequency bands or frequencies of the multispectral acoustic image 1.

As described above, the acquisition step a) is carried out through an array of acoustic sensors and it provides a sub-step a1) calibrating said array of acoustic sensors.

Preferably, calibration sub-step a1) can comprise acquiring an optical image acquired through a camera or videocamera device, there being provided a step c1) of superimposing the acoustic map 3 generated in step c) on the acquired optical image.

As said above, by carrying out the integration on frequencies, FIG. 1a, of multispectral acoustic image 1, the acoustic map 3 shown in FIG. 1a is obtained.

Such acoustic map can be formally defined by equation (29):

$$\hat{I}_t(h,k) \approx \begin{cases} \hat{I}_t^{tr}(h,k) & \text{if } (h,k) \in \bigcup_{sr_m \in tr} R(x_m, y_m) \\ \hat{I}_t^{dr}(h,k) & \text{if } (h,k) \in \bigcup_{sr_m \in dr} R(x_m, y_m) \\ \hat{I}_t^{tr}(h,k) + \hat{I}_t^{dr}(h,k) + n_t(h,k) & \text{else} \end{cases}$$

where:

$\hat{I}_t$ (h, k) is the acoustic map, having a contribution given by:

$\hat{I}_t^{tr}$(h,k) is the acoustic map obtained if present within the space region under examination only the acoustic source of interest were present, $\hat{I}_t^{dr}$(h,k) is the acoustic map obtained if within the space region under examination only noise sources were present, $n_t$ (h, k) is the background noise produced without acoustic sources within the region under examination, R ($x_m$, $y_m$) is the set of pixels comprised in the neighborhood of the coordinate ($x_m$, $y_m$) on the image plane, and it is defined by:

$$R(x_m, y_m) = \{(h,k) : (x_h - x_m)^2 + (y_k - y_m)^2 < r\}.$$

Particularly, the method of the present invention provides between step c) and step h) the following steps to be carried out:

d) locating at least one target acoustic source of interest and modeling the signal spectrum associated with the target acoustic source, e) generating a classification map 2 obtained by comparing the signal spectrum of each signal associated with each pixel of the multispectral acoustic image 1 and the model of the signal spectrum associated with the target acoustic source, f) merging the classification map 2 and the acoustic map 1 to obtain a merged map 4, g) generating a probability function based on the merged map 4.

As it will be described below, the comparison is obtained by training a classification algorithm, which is executed for each pixel of the multispectral acoustic image, to thereby distinguish the signal spectrum associated with the target acoustic source from the signal spectra associated with the remaining acoustic sources.

Figure 1B:
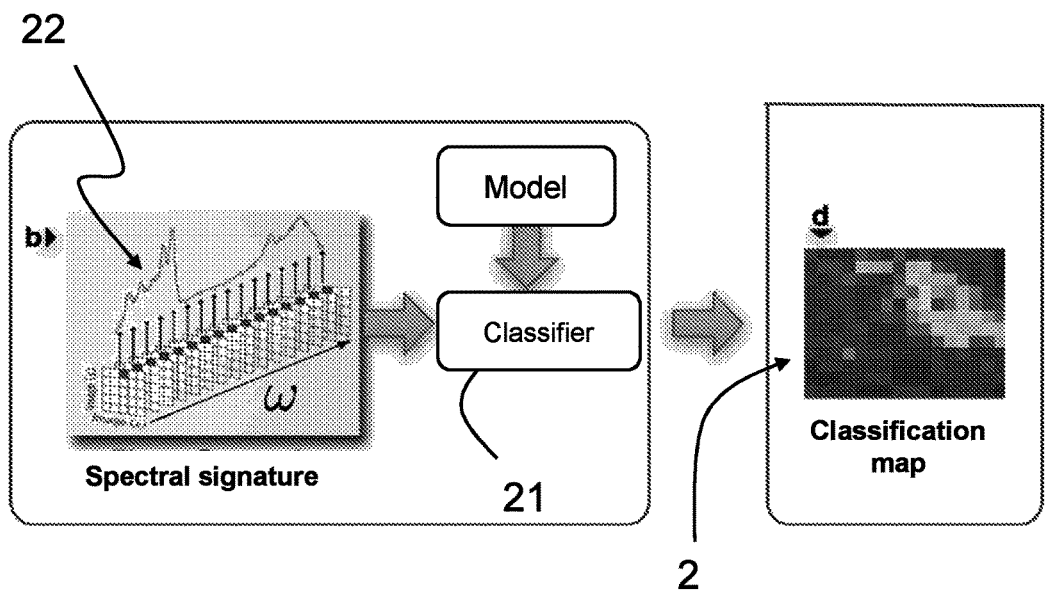

Particularly steps d) and e) related to the implementation of classification map 2, are shown in FIG. 1b.

According to a preferred variant embodiment of the method of the present invention, step d) provides step d1) of identifying the spectral signature 22 of the signal generated by the target acoustic source.

In combination with such characteristic, step e) provides the following sub-steps:

e1) comparing the spectral signature of the signal generated by the target acoustic source with the spectral signatures of the signals associated with the individual pixels of the multispectral acoustic image 1, and e2) generating the classification map 2, such that the value of each pixel of the classification map 2 indicates the probability that each signal being compared will be transmitted by the target acoustic source.

Particularly, in order to generate the classification map 2, it is possible to use the Tracking by detection (TbD) approach used in video systems and widely described in [16] by using as the starting base the detection carried out by the acoustic sensor array, namely starting from the obtained multispectral acoustic image 1.

FIG. 1a shows the multispectral 3D acoustic image 1 composed of a three-dimensional structure having three indexes (h, k, ω), h and k, that correspond to coordinates x and y shown in FIG. 1a, are the coordinates of the 2D image, while ω is the frequency.

FIG. 1b shows steps for generating the classification map 2.

Particularly, a classifier 21 is used and it is trained such to distinguish the spectrum of the signal associated with the target acoustic source 22 from the spectra of non interest.

Such classifier 21 is applied to each pixel of the multispectral image 1 such to obtain the classification map 2, shown in FIG. 1b.

Formally, the classification map 2 of each pixel can be defined as:

$$D_t(h,k) \approx \begin{cases} 1 & \text{if } (h,k) \in \bigcup_{sr_m \in tr} R(x_m, y_m) \\ 0 & \text{if } (h,k) \in \bigcup_{sr_m \in dr} R(x_m, y_m) \\ [0,1] & \text{else} \end{cases} \quad (27)$$

where

[0,1] is a range of values ranging from 0 to 1, $D_t$ (h,k) is the classification map, $x_m$, $y_m$ are the coordinates within the 2D image, sr is a generic acoustic source that can belong to the target acoustic source tr or to noise acoustic sources dr.

According to equation 27, the classification map $D_t$ (h,k) can be divided in M regions, such that each region has a value of about 1 or about 0 depending on the fact that the sound associated with the pixel under examination belongs to the target acoustic source or to the noise acoustic source.

In addition, there is a transition region with indeterminate values ranging from 0 to 1.

Figures 1C, 1D:
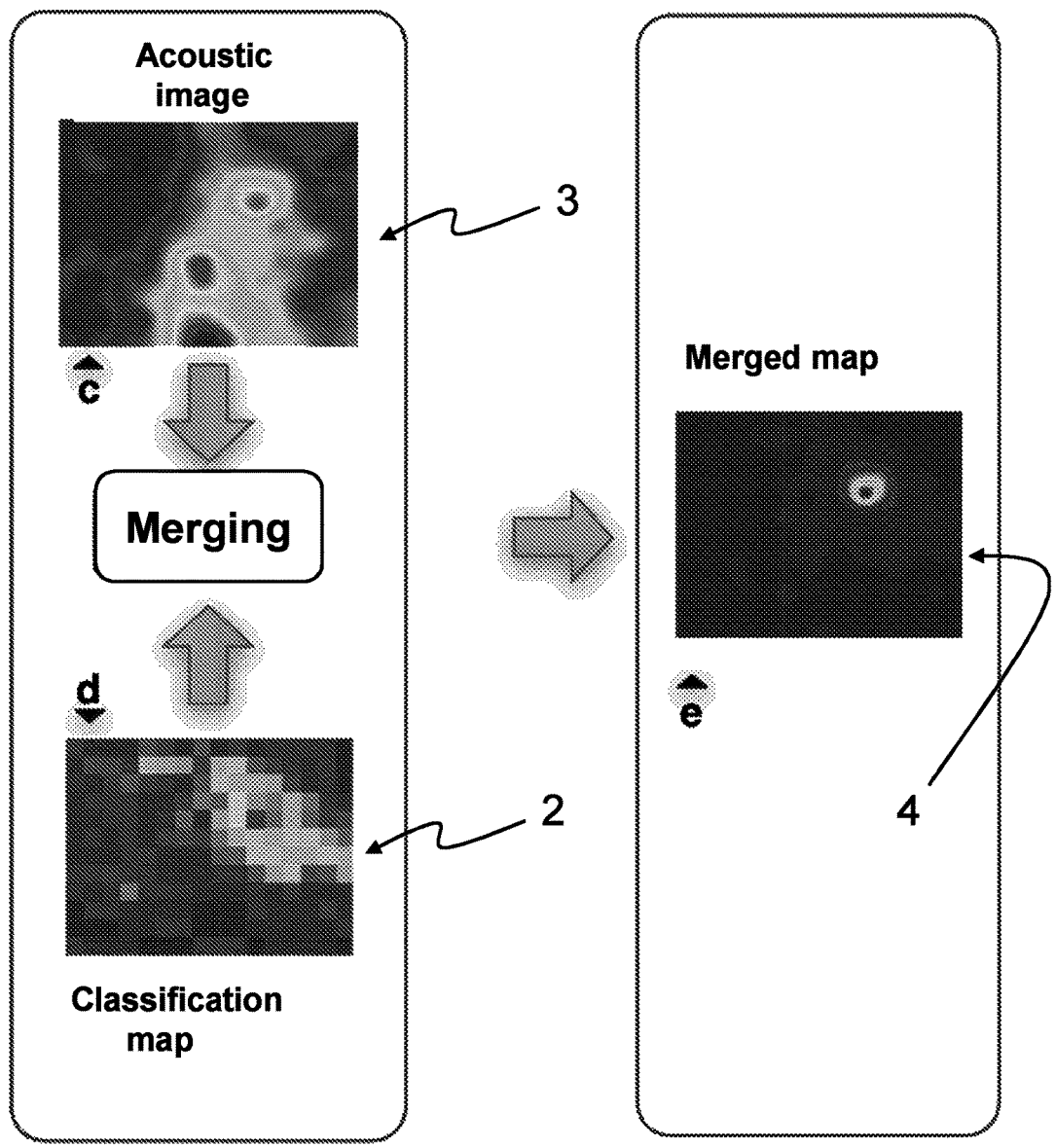

FIG. 1c shows the step following the generation of the classification map, namely step f) merging the acoustic map 3 and the classification map 2.

According to a preferred variant embodiment of the method of the present invention, such step f) is obtained by multiplication of values of pixels of the acoustic map 3 obtained in step c) by the values of the pixels of the classification map 2 obtained in step e).

The merged map 4, shown in FIG. 1d, now can be obtained by merging the classification map 2 and the acoustic map 3.

Particularly such merging is composed of a product between pixels of the two classification map 2 and acoustic map 3.

Due to how the classification map 2 and acoustic map 3 have been defined previously, equations (27) and (29), the merged map 4, resulting from the product between the two maps will be defined as:

$$J_t(h,k) \approx \begin{cases} \hat{I}_t^{tr}(h,k) & \text{if } (h,k) \in \bigcup_{sr_m \in tr} R(x_m, y_m) \\ 0 & \text{if } (h,k) \in \bigcup_{sr_m \in dr} R(x_m, y_m) \\ [0,1] \cdot (\hat{I}_t^{tr}(h,k) + \hat{I}_t^{dr}(h,k) + n_t(h,k)) & \text{else} \end{cases} \quad (31)$$

where $J_t$ (h, k) is the merged map 4.

Figure 2:
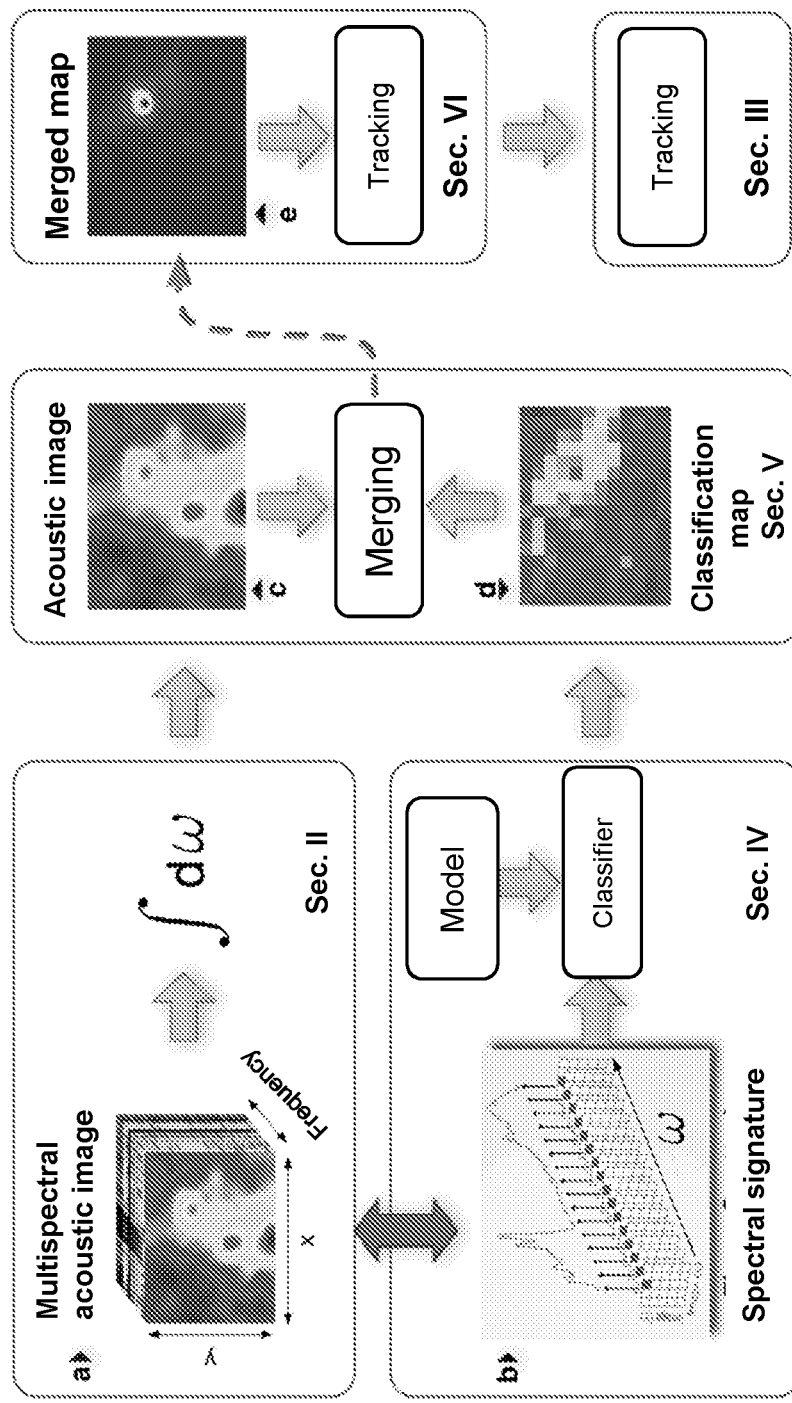
FIG. 2 is a functional block diagram of the method of the present invention according to a preferred embodiment.

As it is clear from FIG. 1c and above all from FIG. 2, the merged map 4 is a clean version of the acoustic map 3, that is, with the noise acoustic sources being removed.

On the basis of equation 31 it is clear how the pixels associated with the regions of interest are kept unchanged, while pixels of the regions of non-interest are reduced to the zero value and the contribution of the pixels of the regions far from any acoustic source, both of interest and non-interest, decreases.

FIG. 2 shows a functional diagram of the whole method of the present invention, where also step g) about the generation of a probability function based on the merged map 4 is added to the steps described and shown above.

Advantageously step g) is carried out by performing the following steps:

g1) transforming the merged map 4 into a probability function, g2) generating a further probability function indicating the possible dynamic path of the target acoustic source, obtained using predetermined dynamic models, g3) comparing the function obtained in step g1) and the function generated in step g2) to express the conditional probability that the merged map 4 has been obtained using the dynamic model of the target acoustic source.

From a formal perspective a vector $s_t$ ($x_t$, $v_t$) is defined where $x_t$ is the coordinates of the target acoustic source on the 2D plane of the image at instant t, while $v_t$ is the speed thereof, still at instant t.

By indicating with $Z_t$ the observation at time t obtained by the acoustic sensor array, the tracking problem is about the estimation of the vector st given the set $Z_{i:t}$, that is the set of the observations from the initial instant to instant t.

Such estimation can be obtained through the posterior probability density function (PDF) that contains all statistical information available about the variable St.

By using the Bayes's theorem such function can be expressed as:

$$P(s_t|Z_{1:t-1}) = \int p(s_t|s_{t-1}) p(s_{t-1}|Z_{1:t-1}) ds_{t-1} \quad (10)$$

$$P(s_t|Z_{1:t}) \propto p(Z_t|s_t) p(s_t|Z_{1:t-1}) \quad (11)$$

Equations 10 and 11 define the dynamic model of the acoustic source of interest.

Particularly equation 10 defines the PDF function at interval t−1: the use of such function in combination with probability function $p(Z_t, s_t)$ allows the relation between state vector and the performed measurements to be modelled, on the basis of equation 11.

Equation 11 can be approximated as it follows:

$$P(s_t|Z_{1-t}) \approx \Sigma_{p=1}^P \omega_t^p \delta(s_t - s_t^p) \quad (12)$$

such to limit the contribution of disturbing noises and acoustic sources: samples $s_t^p$ of the vector $s_t$ are used, a weight w being associated with each one thereof and where δ is a Dirac function.

Each sample at time t is estimated by using a predetermined dynamic model calculated at instant t−1.

The weighting values associated with each sample are calculated on the basis of the probability function.

According to a possible embodiment it is possible to provide the sampling step to be carried out on the basis of the distribution of weights, such to generate a higher number of samples for high weighting values, while reducing the number of samples for low weighting values.

By using equation 12, the estimation of the position of the target acoustic source will be given by:

$$\bar{X}_t = \int X_t p(X_t|Z_{1:t}) dX_t \approx \Sigma_{p=1}^P \omega_t^p (X_t^p) \quad (13)$$

Particularly in order to estimate the proper position of the target acoustic source the approach known as "Tracking Before Detect" described in [12] has been used adapted to the audio tracking problem described in [11].

On the basis of the teachings of such documents and of what described above the posterior distribution has been calculated for the tracking of the target acoustic source, based on the merged map 4, that is on $J_t$ (h, k):

$$p\left(Z \middle| (x, y)\right) \propto \exp\left(\frac{J(\tilde{h}, \tilde{k})}{\sigma_N^2}\right) \quad (38)$$

$$(\tilde{h}, \tilde{k}) \propto \operatorname{argmin}_{(h,k)} \|x_h, y_{k-(x,y)}\| \quad (39)$$

The theoretical bases and the characteristics of the method of the present invention therefore have been applied to an experimental case, where interest has been focused on tracking a vehicle.

Figure 3A:
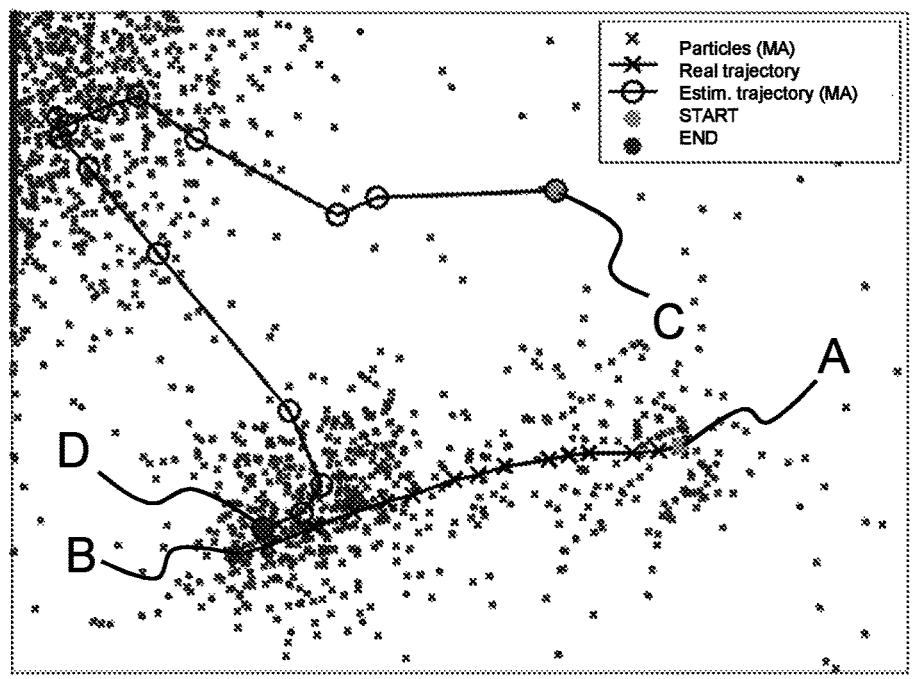
FIGS. 3a and 3b are the tracking of a target acoustic source by using prior art known methods and the method of the present invention respectively.
Figure 3B:
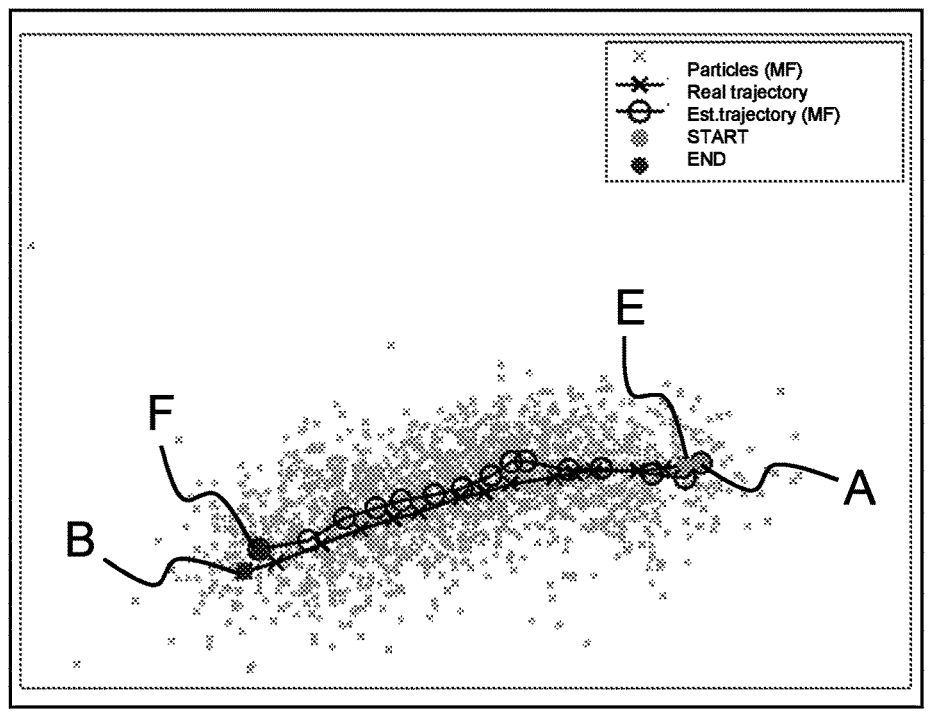

Particularly FIGS. 3a and 3b show the tracking of a target acoustic source using methods known in prior art and the method of the present invention respectively.

The array of acoustic sensors, in this particular case of microphones, intended to acquire the acoustic sources has been placed at the top left angle of FIGS. 3a and 3b.

In this case the acoustic source of interest was a vehicle travelling along a trajectory from point A to point B.

The vehicle was at about 50 meters from the microphone array, while near it there were disturbing noises, people speaking near the microphone array, as well as noisy devices, such as air-conditioners.

Moreover, a motorway at about 500 meters from the microphone array caused a further noise signal.

FIG. 3a shows the tracking of the acoustic source of interest performed by using merely the acoustic map.

It is noted how the tracking algorithm, based only on the acoustic map, produces a wrong trajectory from point C to point D, compared to the real trajectory, from point A to point B.

With a particular reference to FIG. 3a, it is noted how the trajectory from point C to point D is affected by noise acoustic sources, whose distribution is shown by the crosses arranged along the plane of the image 3a.

The path evaluated from point C to point D follows the distribution of acoustic sources, it being irreversibly affected by noise acoustic sources, near the microphone array.

The situation shown in FIG. 3b is different, where the method of the present invention has been used.

The vehicle continues to follow a real trajectory from point A to point B.

Firstly, it is possible to note how in case of presence of the merged map, the image is more clean, removing all the disturbing acoustic sources.

By properly locating the acoustic sources of interest an estimated trajectory of the vehicle from point E to point F is shown, that is near the right trajectory of the vehicle from point A to point B.

REFERENCES

[1] Y. Huang, J. Chen, and J. Benesty, "Immersive audio schemes," Signal Processing Magazine, IEEE, vol. 28, no. 1, pp. 20-32, January 2011.

[2] M. Pucher, D. Schabus, P. Schallauer, Y. Lypetskyy, F. Graf, H. Rainer, M. Stadtschnitzer, S. Sternig, J. Birchbauer, and B. Schalko, W. Schneider, "Multimodal Highway Monitoring for Robust Incident Detection," in Proc. 13th International IEEE Conference on Intelligent Transportation Systems, September 2010.
[3] G. Valenzise, L. Gerosa, M. Tagliasacchi, F. Antonacci, and A. Sarti, "Scream and gunshot detection and localization for audio-surveillancesystems," in IEEE Conference in Advanced Video and Signal Based Surveillance, 2007, AVSS 2007.5-7 2007, pp. 21-26.
[4] Q.-C. Pham, A. Lapeyronnie, C. Baudry, L. Lucat, P. Sayd, S. Ambellouis, D. Sodoyer, A. Flancquart, A.-C. Barcelo, F. Heer, F. Ganansia, and V. Delcourt, "Audio-video surveillance system for public transportation," in 2nd International Conference on Image Processing Theory Tools and Applications (IPTA), 2010, pp. 47-53.
[5] C. Clavel, T. Ehrette, and G. Richard, "Events detection for an audiobased surveillance system," In IEEE International Conference on Multimedia and Expo (ICME), 2005, 6-6 2005, pp. 1306-1309.
[6] M. S. Brandstein and H. F. Silverman, "A practical methodology for speech source localization with microphone arrays," Computer Speech & Language, vol. 11, no. 2, pp. 91-126, 1997.
[7] V. Cevher, R. Velmurugan, and J. H. McClellan, "Acoustic multitarget tracking using direction-of-arrival batches," In IEEE Transactions on Signal Processing, 2007, Vol. 55, no. 6, pp. 2810-2825.
[8] M. Arulampalam, S. Maskell, N. Gordon, and T. Clapp, "A tutorial on particle filters for online nonlinear/non-gaussian bayesian tracking," in IEEE Transactions on Signal Processing, 2002. Vol. 50, no. 2, pp. 174-188, February 2002.
[9] D. B. Ward, E. A. Lehmann, and R. C. Williamson, "Particle filtering algorithms for tracking an acoustic source in a reverberant environment," In IEEE Transactions on Speech and Audio Processing, 2003, Vol. 11, no. 6, pp. 826-836.
[10] C.-E. Chen, H. Wang, A. Ali, F. Lorenzelli, R. Hudson, and K. Yao, "Particle filtering approach to localization and tracking of a moving acoustic source in a reverberant room," In IEEE International Conference on in Acoustics, Speech and Signal Processing (ICASSP) 2006. Proceedings, Vol. 4, May 2006, pp. IV-IV.
[11] M. F. Fallon and S. Godsill, "Acoustic source localization and tracking using track before detect," In IEEE Transactions on Audio, Speech, and Language Processing, Vol. 18, no. 6, pp. 1228-1242, 2010.
[12] D. Salmond and H. Birch, "A particle filter for track-before-detect", in Proceedings of the American control conference, vol. 5, 2001, pp. 3755-3760.
[13] E. A. Lehmann and A. M. Johansson, "Particle filter with integrated voice activity detection for acoustic source tracking," in EURASIP Journal on Applied Signal Processing, vol. 2007, no. 1, pp. 28-28, 2007.
[14] M. Kepesi, F. Pernkopf, and M. Wohlmayr, "Joint position-pitch tracking for 2-channel audio," In IEEE International Workshop on Content-Based Multimedia Indexing (CBMI), 2007, pp. 303-306.
[15] K. Wu, S. T. Goh, and A. W. Khong, "Speaker localization and tracking in the presence of sound interference by exploiting speech harmonicity," In IEEE International Conference on Acoustics, Speech and Signal Processing (ICASSP), 2013, pp. 365-369.
[16] A. Smeulders, D. Chu, R. Cucchiara, S. Calderara, A. Dehghan, and M. Shah, "Visual tracking: An experimental survey," pp. 1-1, 2013.
[17] M. Crocco and A. Trucco, "Design of superdirective planar arrays with sparse aperiodic layouts for processing broadband signals via 3-d beamforming," Audio, Speech, and Language Processing, IEEE/ACM Transactions on, vol. 22, no. 4, pp. 800-815, April 2014.

The invention claimed is:

1. A method of processing an acoustic image comprising the following steps:
   a) acquiring acoustic signals generated by acoustic sources in a predetermined region of space;
   b) generating a multispectral 3D acoustic image (1), consisting of a collection of 2D acoustic images, each 2D acoustic image being formed by transposition of a position of each of the acquired acoustic sources into a grayscale or color model, each 2D acoustic image being identified by a single frequency or a frequency band, such that each 2D acoustic image has the position of each of the acquired audio sources marked thereon along axes of coordinates of the 2D acoustic image, for spatial allocation of the acquired acoustic sources;
   c) performing a frequency integration of said multispectral 3D acoustic image for generating a 2D acoustic map;
   d) locating at least one target acoustic source of interest and modeling a signal spectrum associated with said target acoustic source;
   e) generating a classification map obtained by comparing the signal spectrum of each signal associated with each pixel of said multispectral acoustic image and a model of the signal spectrum associated with said target acoustic source, the step of comparing being obtained by training a classification algorithm, said classification algorithm being executed for each pixel of said multispectral acoustic image, to thereby distinguish the spectrum of the signal associated with the target acoustic source from the signal spectra associated with remaining acoustic sources; and
   f) merging said classification map and said acoustic map to obtain a merged map.

2. The method as claimed in claim 1, wherein step d) comprises the following step:
   d1) identifying a spectral signature of the signal generated by the target acoustic source, and
   wherein step e) comprises the following steps:
   e1) comparing the spectral signature of the signal generated by the target acoustic source with the spectral signatures of the signals associated with the individual pixels of said multispectral acoustic image (1), and
   e2) generating said classification map, such that a value of each pixel of said classification map indicates a probability that each signal being compared will be transmitted by the target acoustic source.

3. The method as claimed in claim 1, wherein step d) comprises a sub-step d2) of identifying spectral signatures of the signals generated by acoustic noise sources, the classification algorithm being trained to distinguish the spectrum of the signal associated with the target acoustic source from the signal spectra associated with the acoustic noise sources.

4. The method as claimed in claim 1, wherein step f) comprises multiplying values of the pixels of the acoustic map obtained in step c) by the values of the pixels of the classification map obtained in step e).

5. The method as claimed in claim 1, wherein step c) comprises weighting the frequencies or frequency bands of said multispectral acoustic image.

6. The method as claimed in claim 1, wherein said method comprises tracking the target acoustic source with the following steps:

g) generating a probability function based on said merged map, and h) executing a tracking algorithm.

7. The method as claimed in claim 1, wherein step g) comprises the following steps:

g1) transforming the merged map into a probability function, g2) generating an additional probability function indicating a possible dynamic path of the target acoustic source, obtained using predetermined dynamic models, and g3) comparing the probability function obtained in step g1) and the additional probability function generated in step g2) to express a conditional probability that said merged map (4) has been obtained using a dynamic model of the target acoustic source.

8. The method as claimed in claim 1, wherein step a) is carried out using an array of acoustic sensors and comprises a substep a1) of calibrating said array of acoustic sensors.

9. The method as claimed in claim 8, wherein said substep a1) comprises acquiring an optical image acquired with a camera or videocamera device, further comprising a step c1) superimposing the acoustic map generated in step c) on the acquired optical image.

10. The method as claimed in claim 6, wherein steps a) to h) are carried out in real-time mode.

\* \* \* \* \*